United States Patent [19]

Schroeder

[11] 4,084,078

[45] Apr. 11, 1978

[54] JET PERFORATOR DEVICE

[75] Inventor: Fred Schroeder, Lakeview Terrace, Calif.

[73] Assignee: American Service Products, Inc., Newhall, Calif.

[21] Appl. No.: 768,683

[22] Filed: Feb. 15, 1977

[51] Int. Cl.² .............................................. B23K 9/00
[52] U.S. Cl. .................... 219/121 P; 44/3 B; 60/253; 148/9 R; 148/9.5; 148/9 C; 228/107
[58] Field of Search .............. 219/121 P; 44/3; 166/1, 166/301, 277, 55.2; 102/102; 148/9 R, 9 C, 9.5; 60/253; 104/15; 149/37-38; 164/53; 228/107

[56] References Cited

U.S. PATENT DOCUMENTS

| 1,191,357 | 7/1916 | Snyder | 102/49 |
|---|---|---|---|
| 2,953,443 | 9/1960 | Lloyd | 149/37 X |
| 2,953,447 | 9/1960 | Schulz | 149/37 |
| 3,166,896 | 1/1965 | Breitengross, Jr. et al. | 60/253 X |
| 3,173,249 | 3/1965 | Wiggins | 60/253 X |
| 3,332,243 | 7/1967 | Wilson | 60/253 X |
| 3,656,432 | 4/1972 | Hackman | 60/253 X |
| 3,765,177 | 10/1973 | Richey et al. | 60/253 |
| 3,794,535 | 2/1974 | Bertrard et al. | 149/38 |

*Primary Examiner*—J. V. Truhe
*Assistant Examiner*—Mark H. Paschall
*Attorney, Agent, or Firm*—Bacon & Thomas

[57] ABSTRACT

A device for perforating or cutting a target made of metal or other materials by means of a plasma jet. The device includes a cast grain of plasma producing pyrotechnic material that is coated over a major portion of its exterior surface with a combustion inhibiting layer. The coated grain is enclosed within an elongate hollow housing provided with closure plates at both ends thereof, with one of the plates having a nozzle opening that is substantially coextensive with a longitudinal recess formed within the grain so that the plasma jet produced by the incendiary reaction of the grain is directed out through the nozzle opening for impingement upon the target.

13 Claims, 5 Drawing Figures

U.S. Patent  April 11, 1978  4,084,078
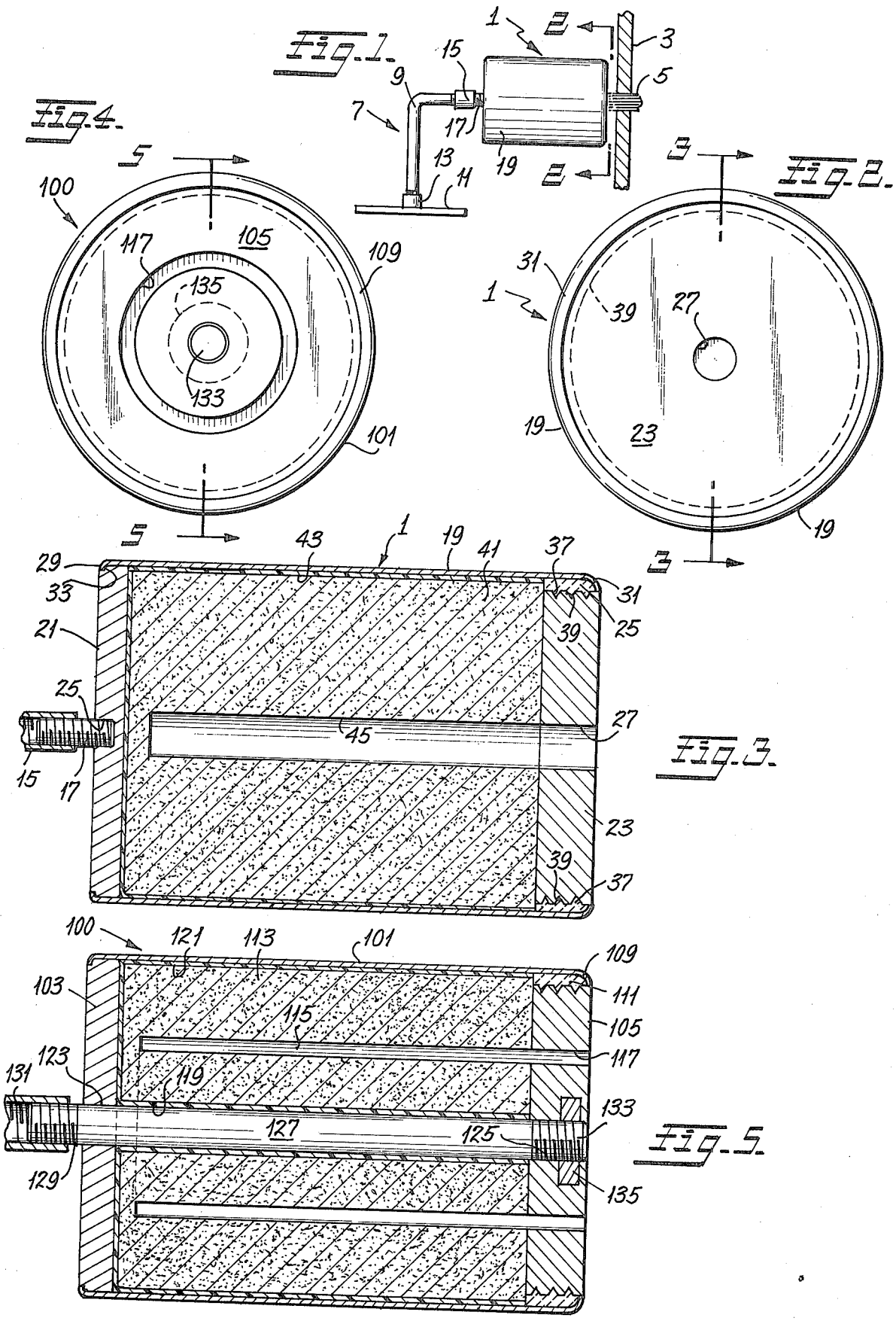

JET PERFORATOR DEVICE

BACKGROUND OF THE INVENTION

1. Field of the Invention

The present invention generally relates to the field of prior art encompassing devices for developing intense heat through reactions of incendiary mixtures broadly classified as Thermit. More particularly, the invention relates to such devices as utilized specifically for perforating or cutting metals or other materials.

2. Description of the Prior Art

The use of certain chemical mixtures which are capable of an incendiary reaction to produce intense heat is well known. Such reactions are generally referred to as Thermit in nature and may be exemplified by a mixture of equal molecular parts of iron oxide and aluminum which react exothermically to produce aluminum oxide and pure iron while simultaneously producing a great deal of heat in the process. These reactions have been utilized to advantage in metal treatment processes wherein intense heat is necessary for altering the physical shape of the metal.

For example, the Linzell U.S. Pat. No. 2,424,947 teaches that a Thermit type of chemical mixture essentially comprising a stoichiometric mixture of calcium sulphate and aluminum may be compacted together and ignited to produce sufficient heat for use in welding metal members or melting high melting point metals or refractory materials. The specific incendiary mixture disclosed by the Linzell patent differs somewhat from the traditional Thermit reaction in that molten metal is not produced by virtue of the combustion reaction between the aluminum and calcium sulfate.

In addition to the welding of metal members and the melting of high melting temperature metals, Thermit type reactions have also been employed for the specific task of cutting or perforating metals such as well casings. The Stanton U.S. Pat. No. 2,535,964 is exemplary of this type of application. The Stanton device utilizes a heat resistant plug which has recesses formed therein for receiving the Thermit mixture. The plug is lowered into the well casing and the incendiary mixtures are electrically ignited so that the heat of the reaction serves to perforate the adjacent wall portions of the casing.

Though the prior art does recognize that Thermit type reactions produced from various combinations of incendiary mixtures may be utilized in specific applications of metal treatment, there does not exist a simple and portable Thermit type device for cutting or perforating metals or other materials which can be easily adapted for a variety of environments or applications of use. A device of this nature should advantageously be capable of operating in hostile environments, such as below zero temperatures or under water. Moreover, this device should be capable of efficiently perforating or cutting metals or performing a variety of related functions, such as quickly destroying classified papers or articles for security purposes.

SUMMARY OF THE INVENTION

It is therefore an object of the invention to provide a jet perforator device for efficiently perforating or cutting metals and other materials by the action of a hot plasma jet produced by the incendiary reaction of a Thermit or pyrotechnic type of material.

It is another object of the invention to provide a jet perforator device which is simple in construction and economical to manufacture.

It is yet another object of the invention to provide a jet perforator device which is extremely compact and portable to thereby afford a variety of applications of use.

It is still a further object of the invention to provide a jet perforator device which is capable of efficiently perforating or cutting metals or other materials in a variety of environments, including those under water or characterized by low temperatures.

The present invention serves to achieve the foregoing objects by providing a device that produces a hot plasma jet from the combustion reaction of an incendiary mixture. The device includes an elongate hollow housing that is provided with closure plates at its opposite ends such that the plates and the internal wall portion of the housing collectively define a space which is substantially entirely filled with a cast grain of the incendiary mixture, a plasma producing pyrotechnic composition including calcium sulfate and aluminum powder. The grain is provided with a coating layer of combustion inhibiting material over a major portion of its external surface and a longitudinal recess formed therein and extending for a substantial distance of its length. This recess communicates with the exterior of the device through a substantially coextensive nozzle opening provided in one of the closure plates such that the configuration of the nozzle opening determines the shape and size of the hot plasma jet exiting therefrom and, consequently, the ultimate shape and size of the perforation or cut to be made in the target material. A support is provided for the purpose of facilitating the positioning of the device directly adjacent the portion of the target being perforated or cut.

Other objects, features and advantages of the present invention will be apparent from the following description of the specific embodiments thereof, with reference to the accompanying drawings, which form a part of the specification, wherein like reference characters designate corresponding parts of the several views.

BRIEF DESCRIPTION OF THE DRAWINGS

FIG. 1 is a fragmentary side elevational view of the jet perforator device of the present invention;

FIG. 2 is an enlarged end elevational view of the jet perforator device of FIG. 1, taken along the line 2—2 thereof;

FIG. 3 is a vertical sectional view, taken along the line 3—3 of FIG. 2;

FIG. 4 is an end elevational view of a second embodiment of the present invention; and FIG. 5 is a vertical sectional view of the jet perforator device of FIG. 4, taken along the line 5—5 thereof.

DETAILED DESCRIPTION OF THE PREFERRED EMBODIMENTS

A jet perforator device 1 according to the invention is shown in an assembled position of use in FIG. 1 of the drawings. A target 3 of metal or other material is perforated or cut by a hot plasma jet 5 produced by device 1. A support, generally indicated at 7, may be utilized for positioning device 1 at the desired elevation and distance from target 3. Support 7 may include an angled rod 9 which is threaded at one end and secured to a flat base member 11 by means of an internally threaded collar 13. The other end of rod 9 may also be threaded and secured within an open ended threaded collar 15, the latter also receiving a threaded stud 17 carried by an end of device 1.

A first embodiment of device 1 is depicted in detail in FIGS. 2 and 3. Device 1 includes an elongate hollow housing 19 made of metal, heavy paper or other suitable material. Housing 19 is provided with a first end closure plate 21 and a second end closure plate 23. Though housing 19 is shown to be cylindrical in configuration with end plates 21 and 23 being of circular configuration, it is understood that any other suitable configuration may be utilized. For example, housing 19 may assume any of a variety of polygonal cross sectional configurations, such as triangular, square or the like. Similarly, plates 21 and 23 may also assume the same cross sectional configuration so that they may be securely fitted within the ends of housing 19.

Plate 21 may be made of aluminum or any other suitable material and receives stud 17 in a corresponding threaded recess 25 formed therein. Plate 23 is provided with a nozzle opening 27 which is continuous throughout the thickness thereof. Because opening 27 serves to direct the hot plasma jet produced by device 1 against target 3, it is essential that plate 23 be made from a material which is capable of withstanding the intense heat produced by the plasma. The preferred material for plate 23 is carbon or any suitable form thereof, particularly graphite.

Because of the heat and pressure produced during the use of device 1, it is necessary that plates 21 and 23 be securely retained within their respective ends of housing 19. This is achieved by forming continuous inturned radial flanges 29 and 31 at the ends of housing 19. Flange 29 secures plate 21 by overlapping an offset ledge 33 formed in the peripheral outer edge of plate 21. Since plate 23 is subjected to intense direct heat and pressure resulting from plasma jet 5 exiting through nozzle opening 27, a separate ceramic retainer ring 35 is provided to firmly secure plate 23 within its corresponding end portion of housing 19. Flange 31 overlaps retainer ring 35 which in turn secures plate 23 in position by means of a plurality of inwardly directed ribs 37 which are received within correspondingly shaped grooves 39 formed in the peripheral edge surface of plate 23. Retainer ring 35 may be made from any ceramic material well known in the art and suitable for the purpose of the present invention. A preferred ceramic material is one which can be poured or cast, such as fire-clay or the like. The ceramic may be cast around plate 23 in a mold or poured and hardened in situ. It is also important that if the ceramic material forming ring 35 is formed in situ, that the ceramic be of such a nature as to expand when dried or cured so that a tight bond and assembly is achieved between plate 23 and the corresponding inner wall portion of the housing 19 to thereby minimize any possibility of plate 23 being moved during use of evice 1. Further, suitable ceramic material capable of being utilized in the practice of the invention should also have good resistance to thermal shock and a low coefficient of heat transmission in order that it can serve as a physically strong heat insulator as well as a secure retainer for plate 23.

As clearly indicated in FIG. 3, the internal wall portions of housing 19, plate 21 and plate 23 collectively define an internal space which is substantially completely filled with a grain 41 of plasma producing pyrotechnic material. For the purpose of the present invention, it has been discovered that the preferred Thermit type of incendiary mixture or composition for use in forming grain 41 be of such a nature as to produce a hot plasma jet in the absence of molten metal. Accordingly, pyrotechnic compositions such as those disclosed by the aforementioned Linzell U.S. Pat. No. 2,424,937, the entire disclosure of which patent is hereby incorporated by reference thereto, have been found to be highly efficient in the practice of the invention. More particularly, the preferred incendiary composition utilized for forming grain 41 comprises a mixture of particulate calcium sulphate and aluminum powder bonded together with water, in the absence of any other binder material. Grain 41 is made by pouring or casting the mixture within a mold having an internal molding configuration corresponding to the desired grain shape and size, and thereafter curing the molded mixture by aging in air at approximately 80°–90° F.

The cured grain is then removed from the mold and has a porous structure with the exception of those portions of its outer surface which were adjacent to the internal walls of the mold. Such surfaces are shiny and smooth because of the fine particles of calcium sulfate from the mixture. This smooth casting skin is removed to expose a porous outer surface consistent with the overall porous structure of the grain. Thereafter, a coating of combustion inhibiting material, such as linseed oil, polyurethane, a polyester or any of those disclosed by the Fite U.S. Pat. No. 3,056,171 and Ritchey et al. U.S. Pat. No. 3,765,177, the complete disclosures of which patents are hereby incorporated with reference thereto, may be utilized to coat a major portion of the external surface of the grain. The purpose of combustion inhibiting coatings or layers is well known and serves essentially to control the direction of combustion of a grain of combustible material or propellant coated therewith.

As seen in FIG. 3, after grain 41 has been provided with a combustion inhibiting layer 43, it is then fitted and sealed within housing 19 and occupies substantially the entire internal space defined thereby in conjunction with the internal wall surfaces of plates 21 and 23. As further indicated in FIG. 3, the major external surface of grain 41 is provided with coating 43 with the exception of that portion adjacent plate 23. Grain 41 is also provided with a longitudinal recess 45 which is free of coating 43 and extends for a substantial distance over the length thereof. Recess 45 communicates with the exterior of device 1 through nozzle opening 27, the latter being substantially coextensive with recess 45. By virtue of this arrangement and the provision of combustion inhibiting layer 43, the combustion of grain 41 is initiated at the vicinity of recess 45 and progresses radially outwardly. The resulting hot plasma flame front is caused to exit out nozzle opening 27 and is prevented from burning around the sides and end of grain 41 because of combustion inhibiting layer 43. The inhibited portions of grain 41 are insulative in nature due to the penetration of the combustion inhibiting material within the porous surface of grain 41.

The ignition of device 1 can be achieved by any method well known in the art for this purpose. For example, an electric squib flame used in conjunction with a relay material such as zirconium and barium peroxide may initially be utilized to raise the temperature of grain 41 to approximately 3000° F. and thereafter igniting another combustible material, such as standard Thermit, to bring the ignition temperature up to approximately 6000° F. The hot plasma produced by the resulting combustion of grain 41 produces only a sufficient amount of thrust to force the plasma jet out nozzle 27 for impingement against target 3. This is to be distinguished from encased propellant grains which utilize compositions specifically designed for imparting a maximum amount of thrust for propelling movement. The thrust or exit velocity of the plasma jet of device 1 may also be controlled by varying the size of the calcium sulfate and/or aluminum particles. The combustion rate and resulting pressure created thereby have been shown to increase with the degree of fineness of the particulate material making up the composition of grain 41.

Another embodiment of the present invention is shown in FIGS. 4 and 5. A jet perforator device 100 according to this embodiment also includes an elongate outer housing 101 provided with corresponding end closure plates 103 and 105. Radially inturned flanges 107 and 109 serve to securely retain plates 103 and 105 within the end portions of housing 101, with plate 105 being further secured by a ceramic ring 111 in the same basic manner as described for device 1 of the first embodiment.

A grain 113 of plasma producing pyrotechnic material occupies the internal space defined by housing 101 and plates 103 and 105. Grain 113 is provided with an annular-shaped longitudinal recess 115 which is substantially coaxial with and extends for a major portion of the longitudinal axis of device 100. Plate 105 is provided with a nozzle opening 117 which is also annular-shaped and substantially coextensive with recess 115. Grain 113 further includes a continuous central bore 119. Except for that portion of grain 113 adjacent to plate 105 and the internal surface of recess 115, the entire exterior surface thereof, including the internal surface of bore 119, is provided with a coating 121 of combustion inhibiting material.

Bore 119 communicates at either end with the exterior of device 100 through substantially coextensive holes 123 and 125 formed in end plates 103 and 105, respectively. A support rod 127 is received within and extends through bore 119, hole 123 and hole 125, with a threaded end portion 129 thereof extending beyond the exterior surface of plate 103 for threaded connection to a collar 131. As indicated for device 1 of the first embodiment, collar 131 functions in the same manner as collar 15 for the purpose of securing device 100 to a suitable support so that nozzle opening 117 can be positioned at the desired distance from the target. The other end of support rod 127 is substantially flush with the exterior surface of plate 105 and is provided with a threaded end portion 133 for engagement with a nut 135 disposed within plate 105. Ignition of device 100 is achieved in the same manner as described for device 1 of the first embodiment.

As is evident, the circular shape of nozzle opening 27 of device 1 will produce a correspondingly shaped plasma jet which will essentially provide a correspondingly shaped perforation in the target. The annular-shaped nozzle opening 117 of device 100 will produce a plasma jet having a similar annular-shaped configuration for the purpose of cutting a hole in the target material having a diameter approximating the outside diameter of opening 117. Thus, the present invention permits the perforating or cutting of a hole in a target having almost any desired size or shape by merely altering the configuration of the nozzle opening and corresponding recess within the grain. In this way, it is not necessary to increase the overall size of the device, thereby maintaining its ease of portability and economy of manufacture.

By way of a specific example, a jet perforator device made in accordance with the first embodiment of the invention as depicted in FIGS. 2 and 3 may have overall dimensions of 3 inches in diameter and 7 inches in length. The nozzle opening may be three-quarters of an inch in diameter and circular to thereby produce a hole in the target material having a corresponding size and shape. The total combustion reaction time of such a device from ignition is approximately 7 seconds. The combustion inhibiting layer applied to the major portion of the exterior surface of the grain should penetrate the pores of the grain to a depth of approximately 0.05 inch. In use, the gases resulting from the combustion of the aluminum and calcium sulphate mixture provides a thrust force reaction that not only propels the plasma towards the target, but also creates a turbulence in the plasma which serves to continuously remove the melted target material during the perforating or cutting process.

It is to be understood that the embodiments of the invention herewith shown and described are to be taken as preferred examples of the same, and that various changes in the shape, size and arrangement of parts and compositions may be resorted to, without departing from the spirit of the invention or scope of the subjoined claims.

I claim:
1. A device for perforating a target by means of a hot plasma jet, which device comprises, in combination:
   a. an open-ended hollow elongate housing;
   b. a first plate forming a closure at one end of the housing;
   c. a second plate forming a closure at the other end of the housing and provided with a nozzle opening therethrough;
   d. a cast grain of plasma producing pyrotechnic material comprising a mixture of aluminum and calcium sulfate, which grain is disposed within and substantially conforms to the entire internal space defined by the housing and plates and includes:
      1. a coating of combustion inhibiting material over a major portion of its external surface, and
      2. a longitudinal recess communicating with the exterior of the device through the nozzle opening.

2. The device of claim 1 further including means for supporting and positioning the device adjacent the target.

3. The device of claim 1 wherein the second plate is made of graphite.

4. The device of claim 1 wherein:
   a. the recess extends for a major portion of the length of the grain, and
   b. the nozzle opening is substantially coextensive with the recess.

5. The device of claim 4 wherein the recess is of a cylindrical configuration.

6. The device of claim 4 wherein the recess is of an annular configuration.

7. The device of claim 1 wherein the ends of the housing each include an inwardly directed flange for securing the first and second plates in their respective closure positions.

8. The device of claim 7 further including a ring of ceramic material disposed between the peripheral edge of the second plate and the adjacent internal surface of the housing for insulating and sealing the second plate in its closure position.

9. The device of claim 8 wherein the ring of ceramic material engages the peripheral edge of the second closure plate by means of a rib and groove interlock.

10. A method of perforating a target comprising the steps of:
 a. positioning a cast grain of pyrotechnic material adjacent the target, wherein the cast grain includes:
  1. a mixture of aluminum and calcium sulfate, and
  2. a coating of combustion inhibiting material over a major portion of its external surface;
 b. igniting the grain to produce a hot plasma jet; and
 c. directing the hot plasma jet against the target for perforating same.

11. The method of claim 10 further including the step of providing a nozzle for directing the hot plasma jet against the target.

12. The method of claim 11 wherein the nozzle has an opening of a substantially circular cross-sectional configuration.

13. The method of claim 11 wherein the cast grain includes a longitudinal recess which communicates with the exterior through the nozzle opening.

* * * * *